United States Patent
Welch et al.

(10) Patent No.: US 11,042,028 B1
(45) Date of Patent: Jun. 22, 2021

(54) RELATIVE POSE DATA AUGMENTATION OF TRACKED DEVICES IN VIRTUAL ENVIRONMENTS

(71) Applicant: University of Central Florida Research Foundation, Inc., Orlando, FL (US)

(72) Inventors: Gregory Welch, Orlando, FL (US); Gerd Bruder, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 0 days.

(21) Appl. No.: 17/146,691

(22) Filed: Jan. 12, 2021

(51) Int. Cl.
| | |
|---|---|
| *G06T 15/08* | (2011.01) |
| *G02B 27/00* | (2006.01) |
| *G06T 19/00* | (2011.01) |
| *G06T 7/73* | (2017.01) |
| *H04W 4/029* | (2018.01) |
| *G02B 27/01* | (2006.01) |

(52) U.S. Cl.
CPC ....... *G02B 27/0093* (2013.01); *G02B 27/017* (2013.01); *G06T 7/75* (2017.01); *G06T 15/08* (2013.01); *G06T 19/006* (2013.01); *H04W 4/029* (2018.02); *G02B 2027/0187* (2013.01)

(58) Field of Classification Search
CPC .............. G02B 27/0093; G02B 27/017; G02B 2027/0187; G06T 7/75; G06T 15/08; G06T 19/006; H04N 4/029
See application file for complete search history.

(56) References Cited

U.S. PATENT DOCUMENTS

| 10,007,350 B1* | 6/2018 | Holz ....................... G06T 7/246 |
| 10,403,050 B1* | 9/2019 | Beall .................... G02B 27/017 |
| 2014/0002359 A1* | 1/2014 | Weising .................. A63F 13/65 |
| | | 345/158 |

(Continued)

OTHER PUBLICATIONS

Welch et al., A Novel Approach for Cooperative Motion Capture (COMOCAP), International Conference on Artificial Reality and Telexistence Eurographics Symposium on Virtual Environments (2018), pp. 73-80.

(Continued)

*Primary Examiner* — Terrell M Robinson
(74) *Attorney, Agent, or Firm* — Anton J. Hopen; Smith & Hopen, P. A.

(57) ABSTRACT

This invention relates to tracking of user-worn and hand-held devices with respect to each other, in circumstances where there are two or more users interacting in the same share space. It extends conventional global and body-relative approaches to "cooperatively" estimate the relative poses between all useful combinations of user-worn tracked devices such as HMDs and hand-held controllers worn (or held) by multiple users. For example, a first user's HMD estimates its absolute global pose in the coordinate frame associated with the externally-mounted devices, as well as its relative pose with respect to all other HMDs, hand-held controllers, and other user held/worn tracked devices in the environment. In this way, all HMDs (or as many as appropriate) are tracked with respect to each other, all HMDs are tracked with respect to all hand-held controllers, and all hand-held controllers are tracked with respect to all other hand-held controllers.

10 Claims, 17 Drawing Sheets

(56) References Cited

U.S. PATENT DOCUMENTS

| | | | | |
|---|---|---|---|---|
| 2014/0375680 | A1* | 12/2014 | Ackerman | G06T 19/006 |
| | | | | 345/633 |
| 2016/0246369 | A1* | 8/2016 | Osman | G06F 3/0346 |
| 2016/0350973 | A1* | 12/2016 | Shapira | G06F 3/017 |
| 2017/0178272 | A1* | 6/2017 | Lashkari | G06T 19/006 |
| 2017/0358140 | A1* | 12/2017 | Kohler | G02B 27/0093 |
| 2018/0005429 | A1* | 1/2018 | Osman | G06T 15/20 |
| 2019/0114802 | A1* | 4/2019 | Lazarow | G06F 1/163 |

OTHER PUBLICATIONS

Rao, Fully decentralised algorithm for multisensor Kalman filtering, IEE Proceedings-D, vol. 138, No. 5, Sep. 1991, pp. 413-420.

Schiff et al., Nonparametric Belief Propagation for Distributed Tracking of Robot Networks with Noisy Inter-Distance Measurements, The 2009 IEEE/RSJ International Conference on Intelligent Robots and Systems, Oct. 11-15, 2009 St. Louis, USA, pp. 1369-1376.

Yang et al., Distributed Cooperative Active Sensing Using Consensus Filters, 2007 IEEE International Conference on Robotics and Automation Roma, Italy, Apr. 10-14, 2007, pp. 405-410.

* cited by examiner

Left-Right

Up-Down

Forward-Backward

Pitch

Roll

Yaw

RELATIVE POSE DATA AUGMENTATION OF TRACKED DEVICES IN VIRTUAL ENVIRONMENTS

BACKGROUND OF THE INVENTION

1. Field of the Invention

This invention relates to improving the relative accuracy and realism of computer simulations. More specifically, it relates to a system for augmenting global pose values with relative pose values between co-located tracked devices in a multi-user virtual reality or augmented reality simulation rendering a shared virtual object.

2. Brief Description of the Related Art

Tracking systems and technologies for interactive computer graphics (e.g., virtual reality, augmented reality and/or related simulation, training, or practice) are used to estimate the pose (e.g., position and orientation), posture (e.g., body articulation), and movement of humans and objects in what is typically a three-dimensional (3D) working volume or space. Common devices used in such settings include head-mounted displays (HMD) or head-worn displays (HWD) such as those sold under the brands OCULUS RIFT, OCULUS QUEST, or MICROSOFT HOLOLENS, and hand-held controllers such as the OCULUS TOUCH controllers, or other hand-held objects such as weapons, tools, or other devices.

The "tracking" can include, for example, the estimation of the HMD or hand-held device 3D positions (x, y, z), and 3D orientations (roll, pitch, yaw) for what is typically called six-degree-of-freedom (6DOF) "pose" tracking of the devices. In some cases, the tracking makes use of additional body-worn devices to extend the estimation to include body parts and the overall body posture, such as arms, hands, legs, and feet in what would typically be called "motion capture" or MOCAP. Tracking and motion capture systems are also sometimes used in circumstances not directly associated with computer graphics, e.g., to evaluate the movement of one or more humans for training, physical therapy, sports practice, and other applications.

All such systems encounter some amount of error (static or dynamic) that can affect the usefulness of the system, and the error problems are compounded if two or more users are being tracked in close proximity to each other and used for some form of a joint task. One cause is that the errors associated with independent user systems are typically independent, and therefore the errors can compound (sum or add) when used in joint tasks.

For systems that track a moving user using a global estimation approach employing externally-mounted devices to estimate the pose in a mathematical coordinate frame associated with the externally-mounted devices, the relative error between tracked devices will increase as the user moves farther away from the externally-mounted devices and/or closer to each other. In other words, as tracked objects get closer and closer to each other, reducing the error in their estimated pose becomes increasingly important. So-called "body-relative" tracking approaches have been developed to reduce the distance from devices held in the hand, or worn on a person's appendages or limbs, e.g., hands, feet, fingers, or toes. However, such approaches are conventionally used only to track the hand-held or body-worn devices of one user with respect to that one user. Such approaches are not designed to track the HMDs, hand-held controllers, or other devices associated with other users, i.e., such approaches are not designed to track one user's devices with respect to a second user's devices.

Prior art systems suffer in at least two respects for multi-user circumstances. First, the body and objects pose/posture for each user are estimated independently in an "open loop" fashion. There is no feedback or cooperation between the multiple user-worn systems, so any virtual (VR or AR) entities the user sees are not necessarily aligned or registered with each other (not accurately collocated). Second, as multiple users get close to each other, most conventional systems (those that require line-of-sight sensing, which is most of them) simply stop working if the tracking components are occluded (blocked) by another user, or some object in the environment.

BRIEF SUMMARY OF THE INVENTION

If two simultaneous users (VR, AR, or non-VR/AR uses) equipped with acoustic, optical, or other source-sensor (transmit-receive) devices suffering from occlusion problems get close to each other or bring tracked objects close to each other, the tracking system performance will degrade significantly, and even fail for a variety of reasons. With the present invention, HMDs, hand-held controllers, and other tracked devices enjoy improved performance as they approach each other. The invention has the added benefit of allowing the HMDs, hand-held controllers, or other tracked devices to "ride out" periods of reduced or no observability with respect to externally-mounted devices, e.g., due to occlusion or other signal interference causes, as their proximity would allow them to be tracked relative to each other in a relatively robust manner, providing at least that relative pose estimation even if the global estimation is temporarily unavailable.

Another aspect of the invention is the mechanism for choosing which measurements to "take" at every moment. One cannot take all measurements all the time. Embodiments of the invention employ "time division multiplexing" or "space division multiplexing." However, normally one would prioritize the measurements and go after the ones that are most needed, or most valuable, or easy, or won't interfere with other measurements, etc. In general, longer samples generally correspond to increase signal, e.g., more photons in a camera image, etc. However, when one or both objects are in motion (e.g., one/both vehicles are moving relative to each other), longer samples will result in "blur" in the case of cameras (similar for other measures). As the "shutter" (exposure) time is increased, the advantage of "more light is better" is trounced by the "blur" caused by the long exposure.

For example, an embodiment of the invention decreases the measurement frequency interval in the communication pathway between the first device and the second device as the proximity between the first device and second device decreases. In other words, as the corporeal devices approach each other, it is more important to take collaborative measurements between them. When two HMDs are more than ten feet apart, they take a distance measurement every second. When they are within 5 feet of each other, they measure their relative distance every tenth of a second. When the two HMDs are within 3 feet of each other, they measure their relative distance every hundredth of a second. Conversely, the measurement frequency interval is lengthened (increased) as the proximity between the first device and second device increases.

Finally, this approach is extensible beyond the tracked devices to the full human body by added tracking transmitters, receivers, or transceivers (or other tracked devices) to other parts of the body. Under normal conditions, two users nearby each other will enjoy system estimates determined cooperatively, and hence in agreement with each other. For example, if two people wearing MICROSOFT HOLOLENS units are together looking at a nearby AR (virtual) object in a real scene, their two systems will share a common, cooperatively determined estimate for where that object should appear, reducing the likelihood of each system having different estimates, resulting in objects appearing in different (slightly or grossly) locations for each of the two users.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
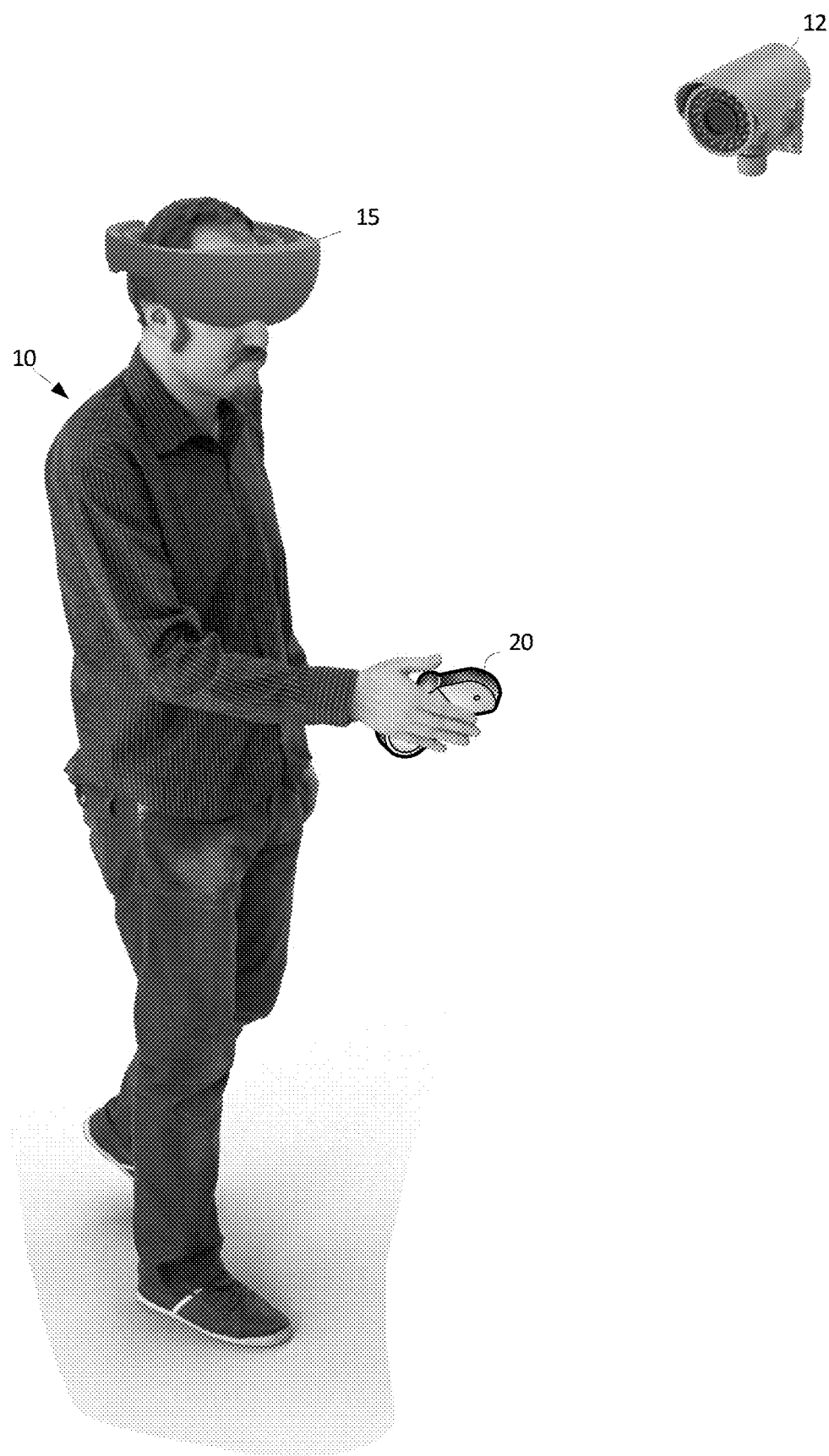
FIG. 1 is a perspective, rendered view of a person wearing an HMD and holding a hand controller.
Figure 2:
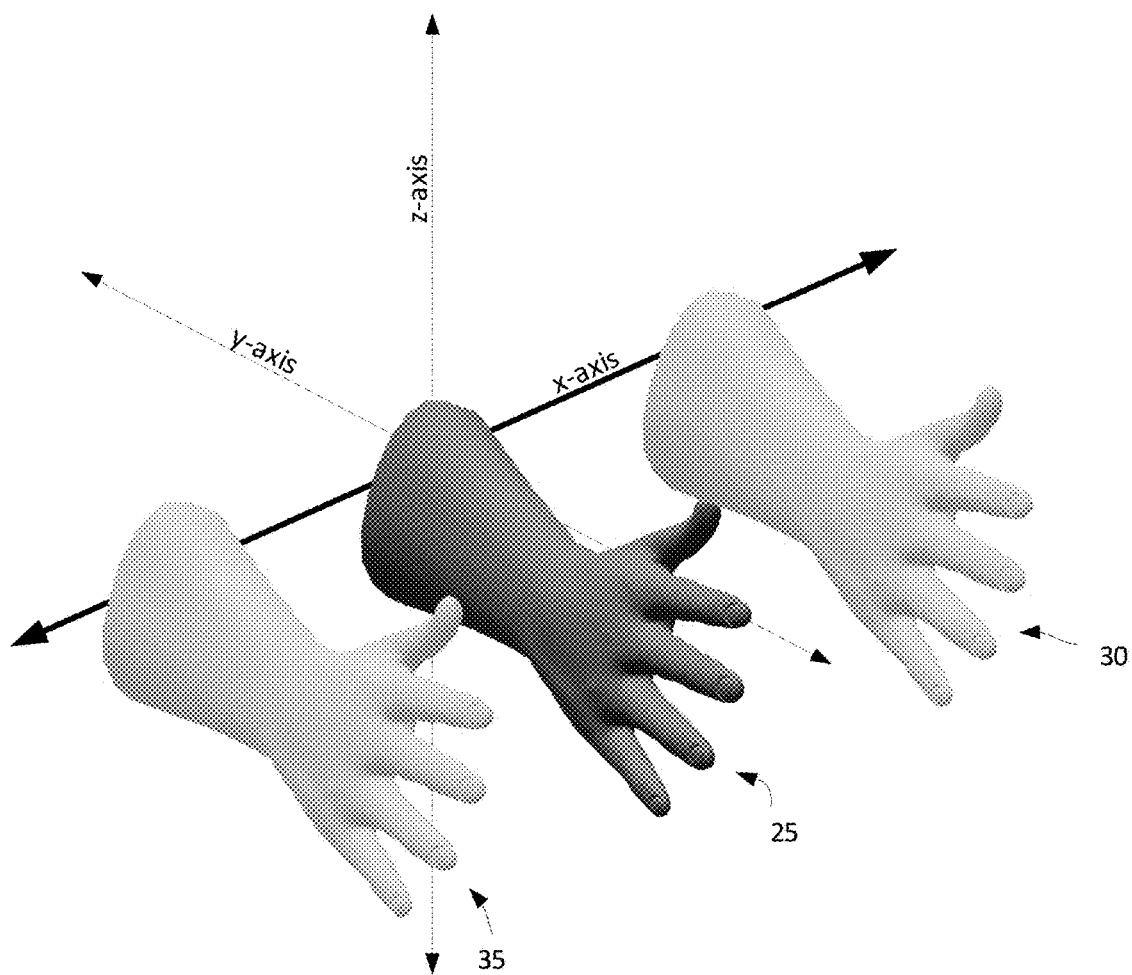
FIG. 2 is an isometric view of left to right movement of a rendered hand along an X-axis.

We disclose a novel approach to tracking user-worn and hand-held devices in circumstances where two or more users interact within the same shared space. This approach combines and extends conventional global and body-relative approaches to "cooperatively" estimate or augment the relative poses between all useful combinations of user-worn tracked devices, such as HMDs and hand-held controllers worn (or held) by a plurality of users. For example, a first user's HMD estimates its absolute global pose in the coordinate frame associated with the externally-mounted devices, as well as its relative pose with respect to all other HMDs, hand-held controllers, and other user held/worn tracked devices in the environment. In this way, all HMDs (or as many as appropriate) are tracked with respect to each other, all HMDs are tracked with respect to all hand-held controllers, and all hand-held controllers are tracked with respect to all other hand-held controllers. The approach can be extended beyond the tracked devices to the full human body by added tracking transceivers (or other tracked devices) to other parts of the body.

One approach involves the use of externally-mounted (not on the user) devices used to track the user with respect to the external environment. This is sometimes referred to as an "outside-looking-in" approach, although the externally-mounted devices are not always sensors (e.g., cameras), they could also be sources (e.g., light planes). Another approach uses body-worn devices to track the user with respect to the external environment. This is sometimes referred to as an "inside-looking-out" approach, although the body-worn devices are not always sensors (e.g., cameras), they could also be sources (e.g., lasers). Conventional tracking systems, e.g., common optical systems, typically perform acceptably well for one person, but less so for multiple people in close proximity. Measurement quality typically declines with distance, and measurements can drop out as humans move around, causing source/sensor interference.

All systems encounter some amount of error (static or dynamic) that can affect the system's usefulness. These error problems are compounded if two or more users are being tracked in close proximity to each other and used for some form of a joint task. One cause is that the errors associated with independent user systems are typically independent, and therefore the errors can compound (sum or add) when used in joint tasks. For example, a first user employing a first HMD might see a first hand-held controller in a first 6D pose, whereas a second user employing a second HMD might see the first hand-held controller in a second 6D pose that is different from the first 6D pose. One result would be that the first and second users perceive the first controller in different places, which could affect their ability to interact in a way that involved both users perceiving a common 6D pose of the first controller. Similar circumstances could arise when the first and second users attempt to carry out activities using both of their (first and second) controllers in close proximity under circumstances where the accuracy matters, e.g., a virtual sword fighting game or team training for groups of marines, soldiers, or healthcare providers.

For systems that track a moving user using a global estimation approach employing externally-mounted devices (e.g., outside-looking-in or inside-looking-out) to estimate the pose in a mathematical coordinate frame associated with the externally-mounted devices, the relative error between tracked devices will increase as the user moves farther away from the externally-mounted devices and/or closer to each other. For example, the relative error between a first and second hand-held controller would be the error ratio in the distance between the first hand-held controller and the externally-mounted devices, to the distance between the first and second hand-held controller.

$$\text{Error}_{Relative} = \frac{\text{Controller} - \text{to} - \text{External} - \text{Device}_{Distance}}{\text{Controller} - \text{to} - \text{Controller}_{Distance}}$$

In this example, as the first controller moves farther away from the externally-mounted devices, the numerator grows, which causes the relative error (ratio) to grow. As the distance the first hand-held controller moves closer to the second hand-held controller, the denominator shrinks, which again causes the relative error (ratio) to grow. Another way of thinking about this is that as tracked objects get closer and closer to each other, reducing the error in their estimated pose becomes more and more important. So-called "body-relative" tracking approaches have been developed to reduce the distance from devices held in the hand, or worn on a person's appendages or limbs, e.g., hands, feet, fingers, or toes. (See, Eric Foxlin and Michael Harrington, 2000. Weartrack: A self-referenced head and hand tracker for wearable computers and portable VR.) Such approaches employ body-worn sensors/sources to track hand-held objects with respect to those body-worn sensors/sources, in a mathematical coordinate frame associated with the body, taking advantage of the certain proximity of the hand-held objects to the body. However, such approaches are conventionally used only to track the hand-held or body-worn devices of one user with respect to that one user. Such approaches are not designed to track the HMDs, hand-held controllers, or other devices associated with other users.

To address these and other multi-user problems, we have developed a novel approach to tracking user-worn and hand-held devices in circumstances where there are two or more users interacting in the same share space. Our approach combines and extends conventional global and body-relative approaches to "cooperatively" estimate the relative poses between all useful combinations of user-worn tracked devices such as HMDs and hand-held controllers worn/held by two or more users. For example, a first user's HMD would estimate its absolute global pose in the coordinate frame associated with the externally-mounted devices, as well as its relative pose with respect to all other HMDs, hand-held controllers, and other user held/worn tracked devices in the environment. In this way, all HMDs (or as many as appropriate) would be tracked with respect to each other, all HMDs tracked with respect to all hand-held controllers, and all hand-held controllers tracked with respect to all other hand-held controllers.

This has the added benefit of allowing the HMDs, hand-held controllers or other tracked devices to "ride out" periods of reduced or no observability with respect to externally-mounted devices, e.g., due to occlusion or other signal interference causes, as their proximity would allow them to be tracked relative to each other in a relatively robust manner, providing at least that relative pose estimation even if the global estimation is temporarily unavailable. Finally, the approach can be extended beyond the tracked devices to the full human body by added tracking transceivers (or other tracked devices) to other parts of the body.

In some circumstances, such novel device-relative tracking can be implemented using the tracking components (e.g., cameras and LEDs) that already exist in conventional HMDs, hand-held controllers, and other tracked devices. In some circumstances, a person of ordinary skill might add or change the components or configurations of these components to improve the device-relative tracking.

In general, optical, magnetic, and other types of components could be used. Algorithmically a person of ordinary skill might make use of known methods for relative device estimation such as from the field of robotics (e.g., B. Rao and H. Durrant-Whyte 1991. Fully decentralized algorithm for multisensor Kalman filtering. Control Theory and Applications, IEE Proceedings D 138, 5 (September), 413-420.), or full-body motion capture (e.g., Greg Welch and Gerd Bruder: A Novel Approach for Cooperative Motion Capture (COMOCAP). In: Bruder, G; Cobb, S; Yoshimoto, S (Ed.): ICAT-EGVE 2018—International Conference on Artificial Reality and Telexistence and Eurographics Symposium on Virtual Environments, The Eurographics Association, Limassol, Cyprus, 2018.) to achieve the relative tracking of HMDs, hand-held controllers, and other tracked devices as taught herein.

Turning now to FIG. 1, first user 10 wears first HMD 15 and holds first controller 20 in his right hand. An external device 12 (or a plurality of external devices 12) establishes a global pose first HMD 15, first controller 20, first 10 and/or a combination thereof. In a coordinate space, the external device 12 can maintain a relatively accurate first global pose. However, when the coordinate space is shared or co-located with multiple users, that is where issues may arise.

Figure 3:
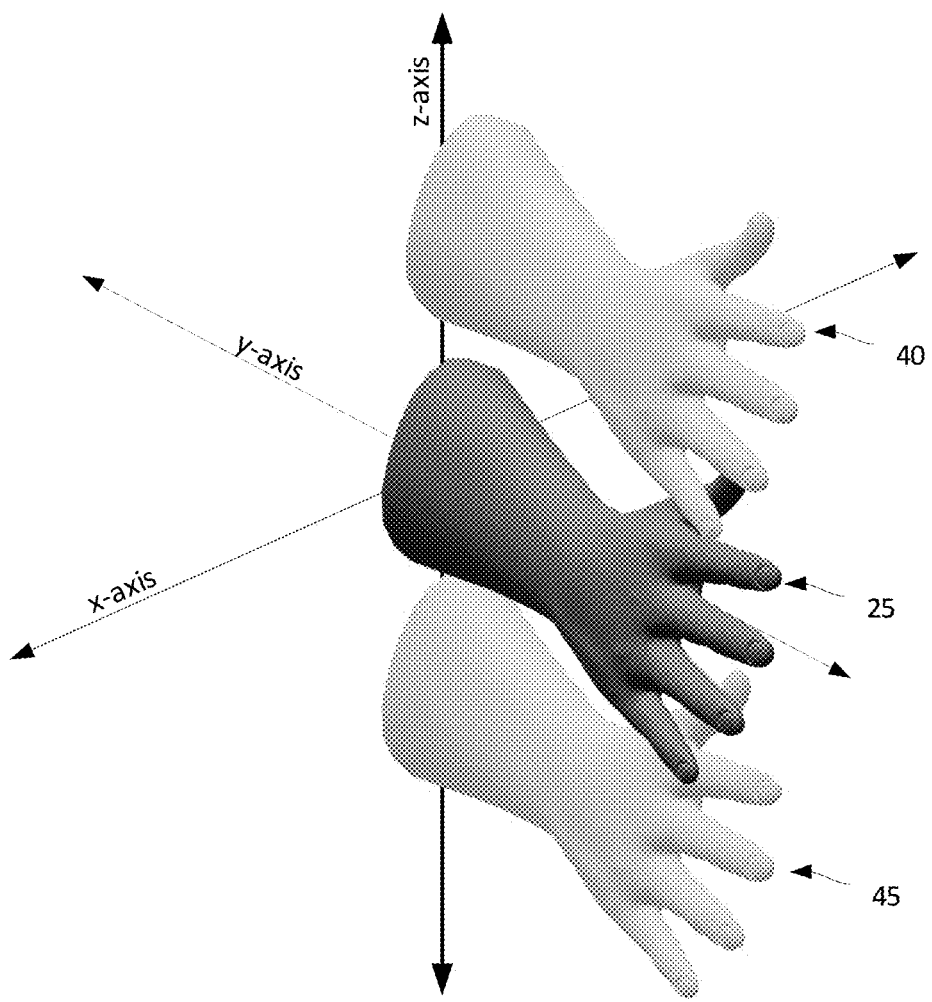
FIG. 3 is an isometric view of up and down movement of a rendered hand along a Z-axis.
Figure 4:
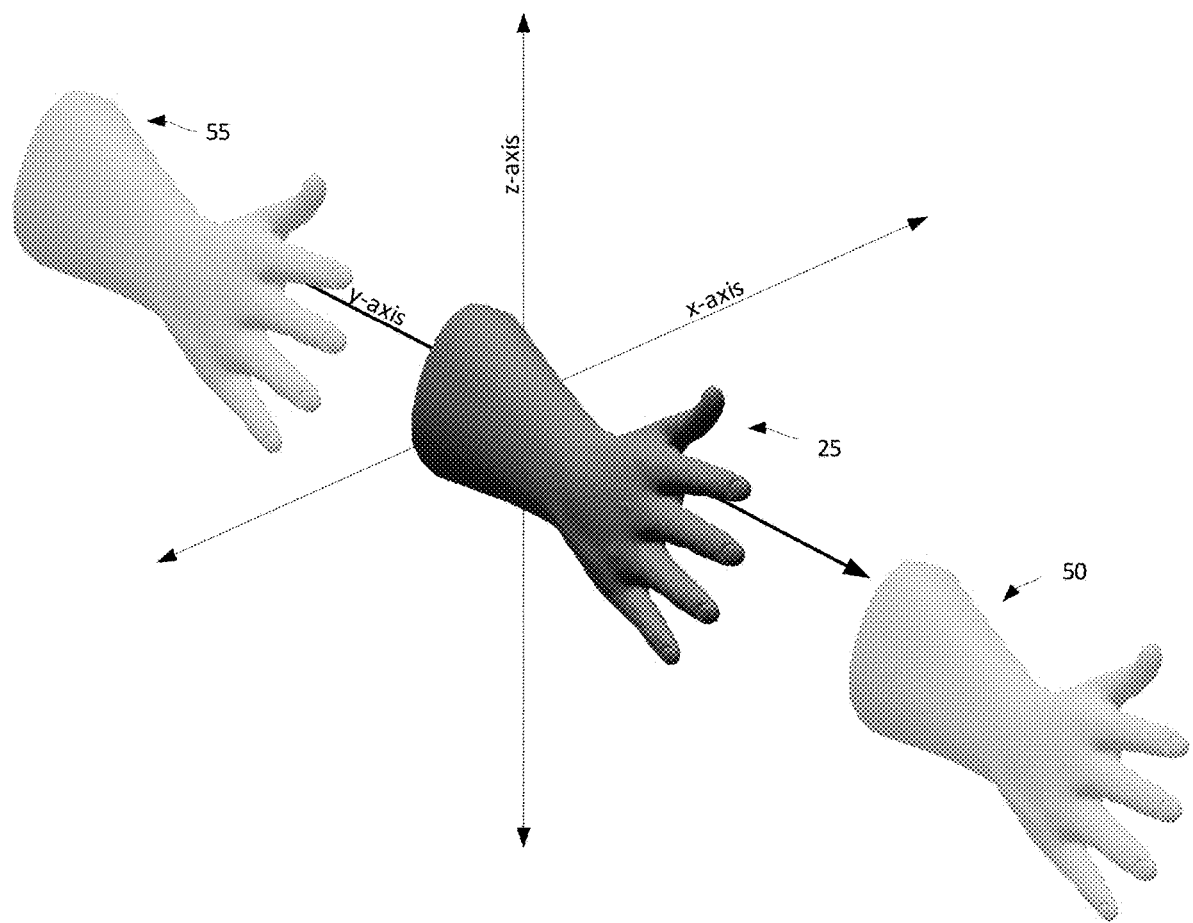
FIG. 4 is an isometric view of forward and backward movement of a rendered hand along a Y-axis.
Figure 5:
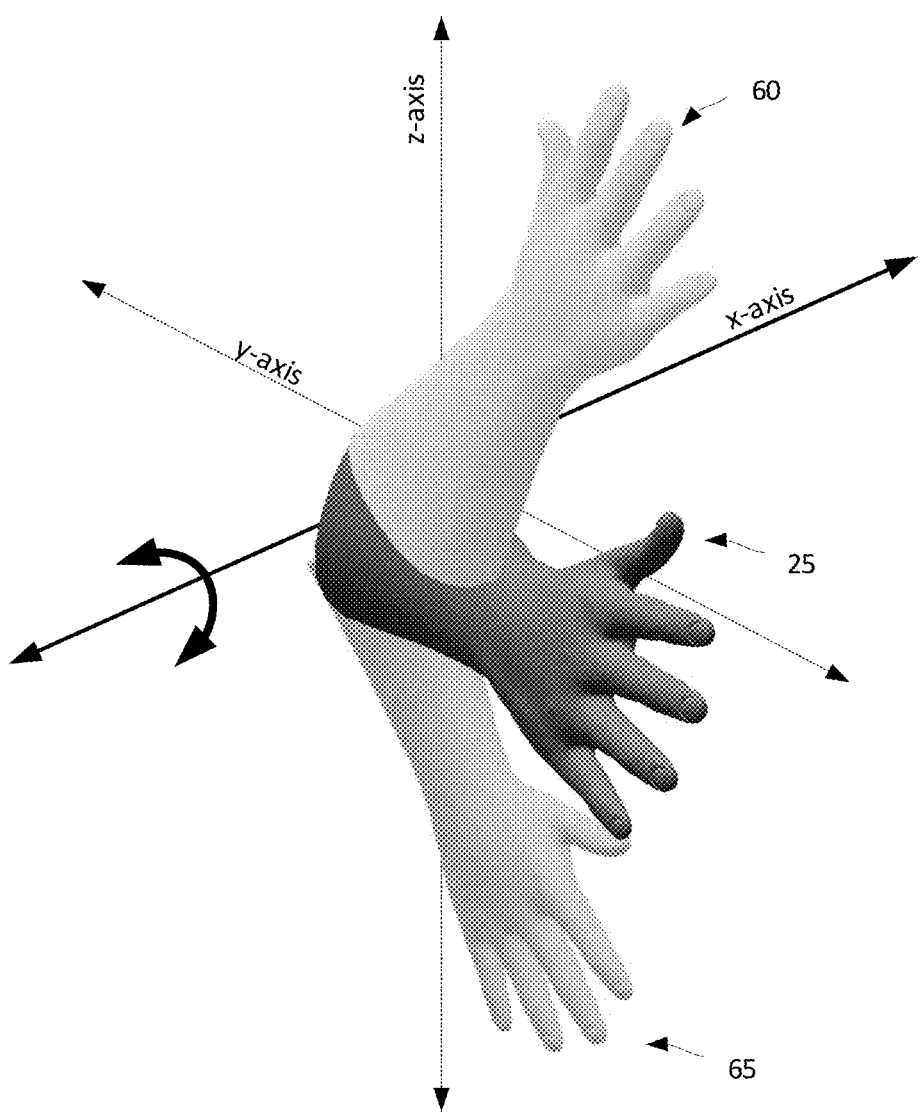
FIG. 5 is an isometric view of pitch movement of a rendered hand at an X-axis pivot.
Figure 6:
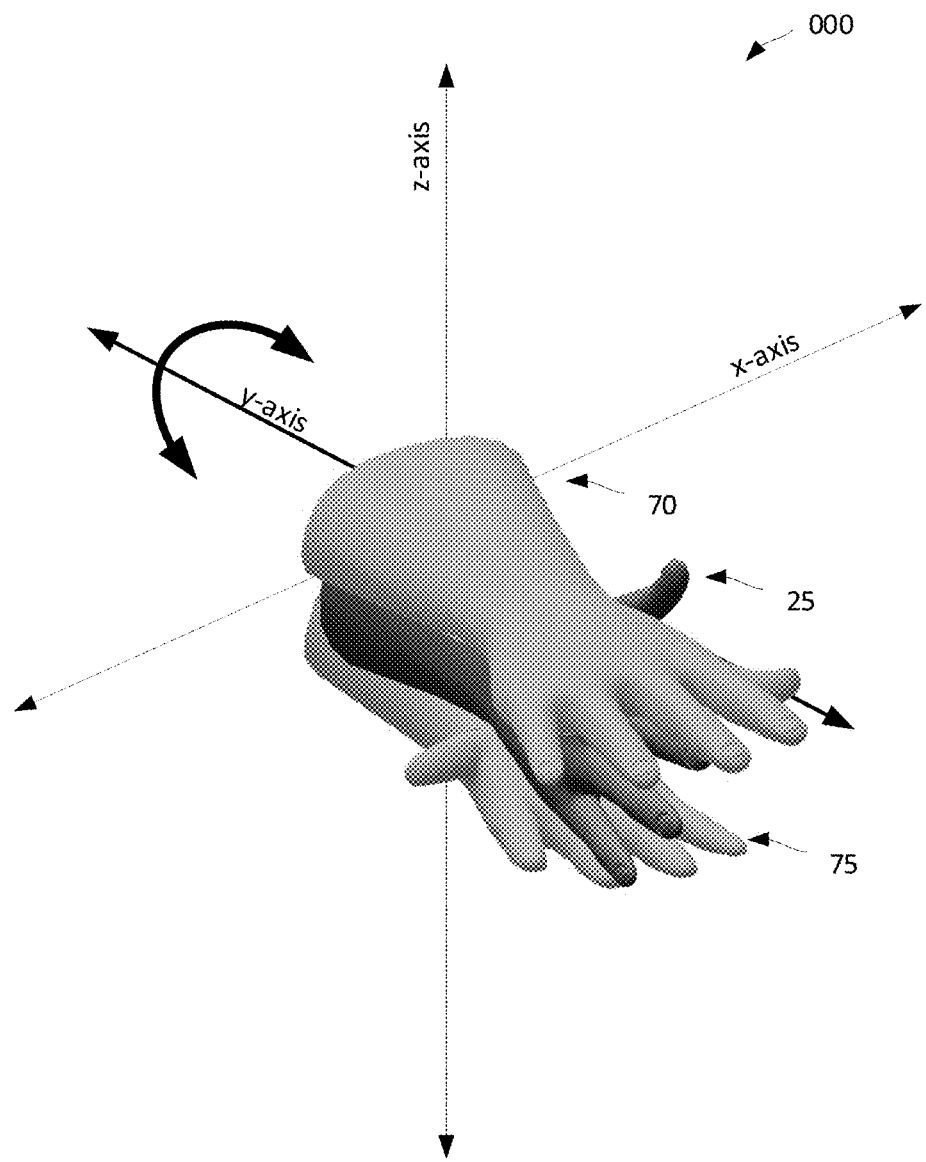
FIG. 6 is an isometric view of roll movement of a rendered hand at a Y-axis pivot.
Figure 7:
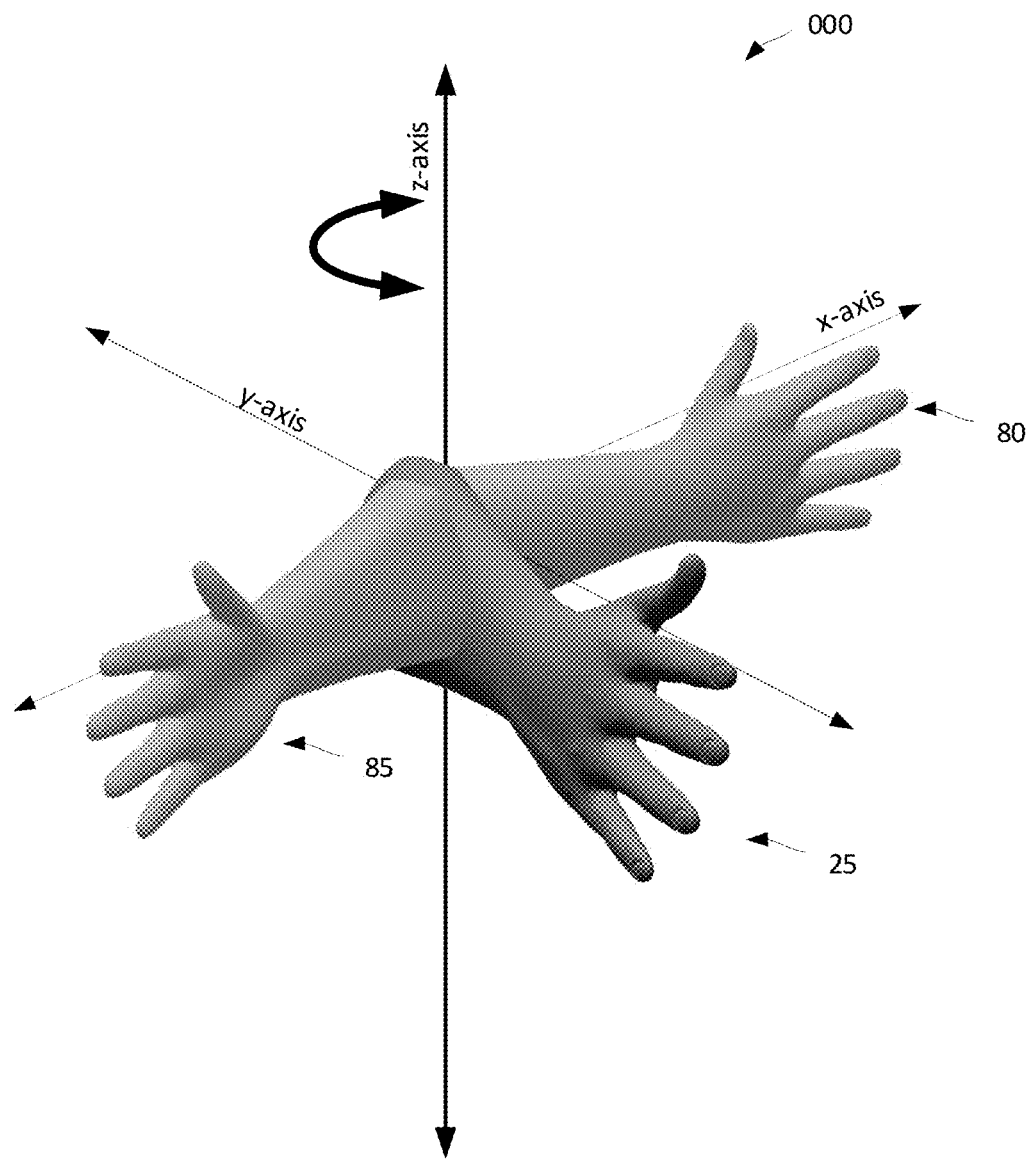
FIG. 7 is an isometric view of yaw movement of a rendered hand at a Z-axis pivot.

FIGS. 2-7 show the components of spatial orientation and positions that comprise pose data. For example, in FIG. 2, a centered right hand 25 moves to a left position 30 and a right position 35 along an X-axis in a coordinate system. In FIG. 3, centered right hand 25 moves to up position 40 and down position 45 along the Z-axis. In FIG. 4, centered right hand 25 moves to forward position 50 and back position 55 along the Y-axis. In FIG. 5, centered hand 25 pitches up to position 60 and pitches down to position 65 about an X-axis pivot. In FIG. 6, centered hand 25 rolls clockwise to position 70 and rolls counter-clockwise to position 75 about a Y-axis pivot. In FIG. 7, centered hand 25 yaws left to position 80 and yaws right to position 85 about a Z-axis pivot. FIGS. 2-7 illustrate the six degrees of freedom (6DoF) which is the movement of a rigid body in three-dimensional space.

Figure 8:
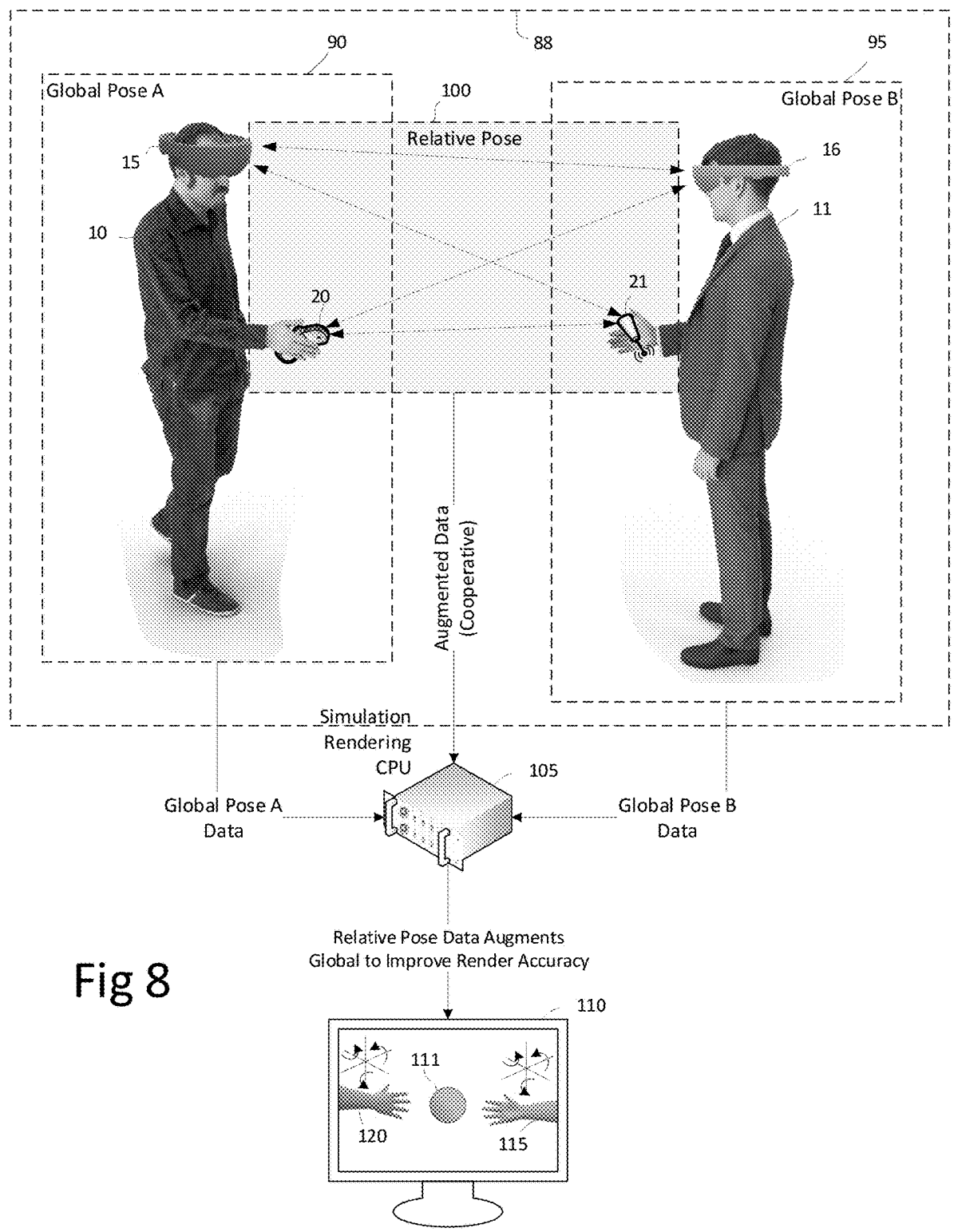
FIG. 8 is an elevated, combined rendered, and diagrammatic view of communication between two HMD devices according to an embodiment of the invention showing sensor detection between HMDs and hand-held controllers.

Turning now to FIG. 8, first user 10 and second user 11 are in a co-located space. This means they can physically come into contact as opposed to being "remote" with respect to each other. A first global pose 90 defines the pose for first user 10 in a common global coordinate frame 88. A second global pose 95 defines the pose for second user 11 in the same common global coordinate frame 88. First user 10 is wearing first HMD 15 and first hand-held controller 20. Second user 11 is wearing second HMD 16 and second hand-held controller 21. The global poses 90 and 95 may be estimated from an external device or process, e.g., triangulation by optical, radio, or audio signals. The process might include establishing common anchor points in the co-located space (in the common global coordinate frame 88). Unlike prior art systems, this embodiment uses signal sources and/or sensors in hand-held controllers 20 and 21 and HMDs 15 and 16 to take relative measurements of distance, position and/or orientation between the devices, e.g., between each pair of devices.

These measurements are combined with global pose estimates 90 and 95 in simulation rendering CPU 105 to augment and improve the geometric accuracy (e.g., position and orientation) of the rendering of a common shared virtual object 111 in simulation 110, as seen by each user 10 and 11 in their respective HMDs 15 and 16. In this example, the first user 10 extends a first rendered hand 120 to touch a common shared virtual object 111, while the second user 11 extends a second rendered hand 115 in an attempt to touch the same common shared virtual object 111 at the same location on the common shared virtual object 125 as the first user 10. The measurements made by the equipment on or held by first user 10 and second user 11 cooperate so that the relative accuracy of the rendered hands and the common shared virtual object 111 is improved. This is particularly useful in virtual and augmented reality training scenarios where two or more participants in a co-located space are attempting to manipulate common virtual objects. As the participants physically move nearer to each other the cooperative measurement data improves the relative geometric parameters (e.g., positions and orientations) of the rendered entities within the simulation.

It should be noted that in an augmented reality environment, there would typically be no need to render hands or limbs over the already viewable co-located user. Therefore, in an augmented reality environment, the shared virtual object 111 is an object viewable between or at least separated from both physical user forms (e.g., a spinning globe or medical patient). Alternatively, in a virtual reality environment, the shared virtual object may indeed be a hand, limb, or other physical rendered object wherein its relative pose between users is enhanced according to the cooperative measurements according to the invention. As the users are in a co-located space and in a virtual reality environment, they are operatively "blind" but for the relative spatial rendering between each user's corporeal form.

Figure 9:
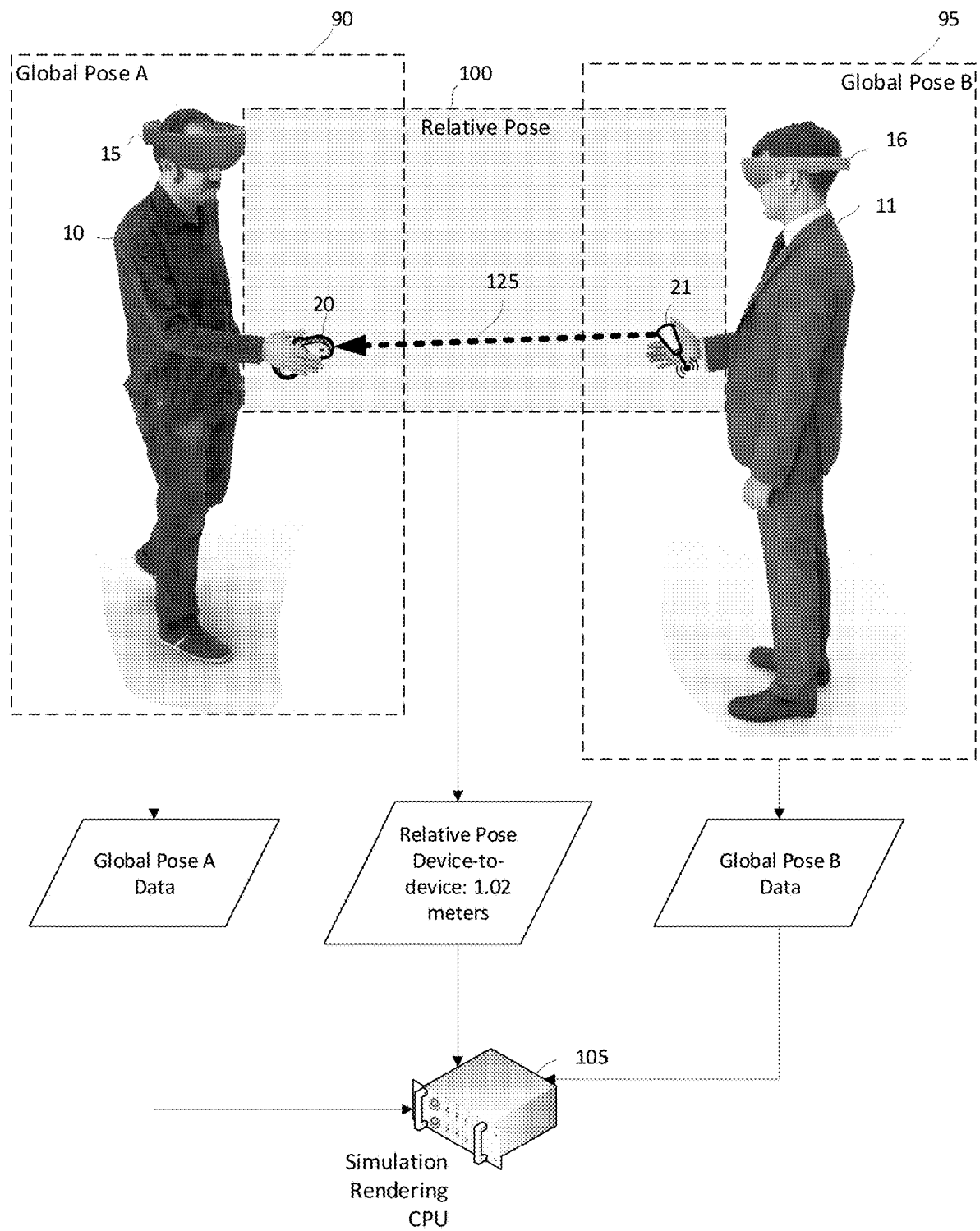
FIG. 9 is an elevated, combined rendered, and diagrammatic view of communication between two HMD devices according to an embodiment of the invention showing sensor detection of a hand-held controller to derive a distance measurement.

FIG. 9 shows a specific measurement 125 obtained from hand-held controller 21 and hand-held controller 22, measuring the distance as 1.02 meters between them using an ultrasonic sound sensor. The 1.02-meter measurement 125 is used in the simulation rendering CPU 105 to enhance the accuracy of the relative pose between users 10 and 11. In an embodiment of the invention, the device-to-device measurement accuracy may be weighed against the global pose data to best estimate the relative pose to common shared virtual object 111.

Figure 10:
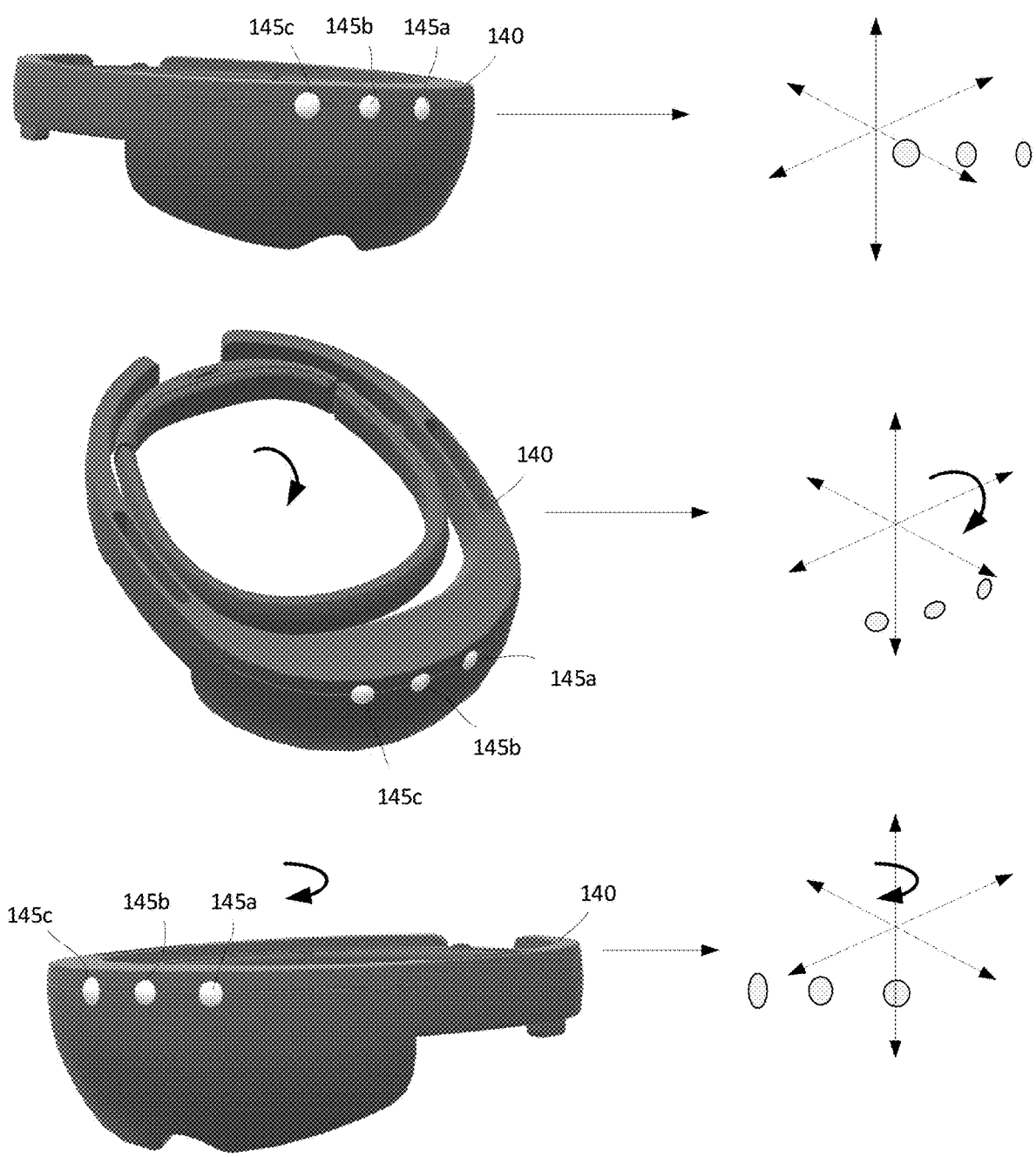
FIG. 10 is an elevated, isometric view of an HMD fitting with a plurality of IR LED lights that convey POSE data of the HMD.
Figure 11:
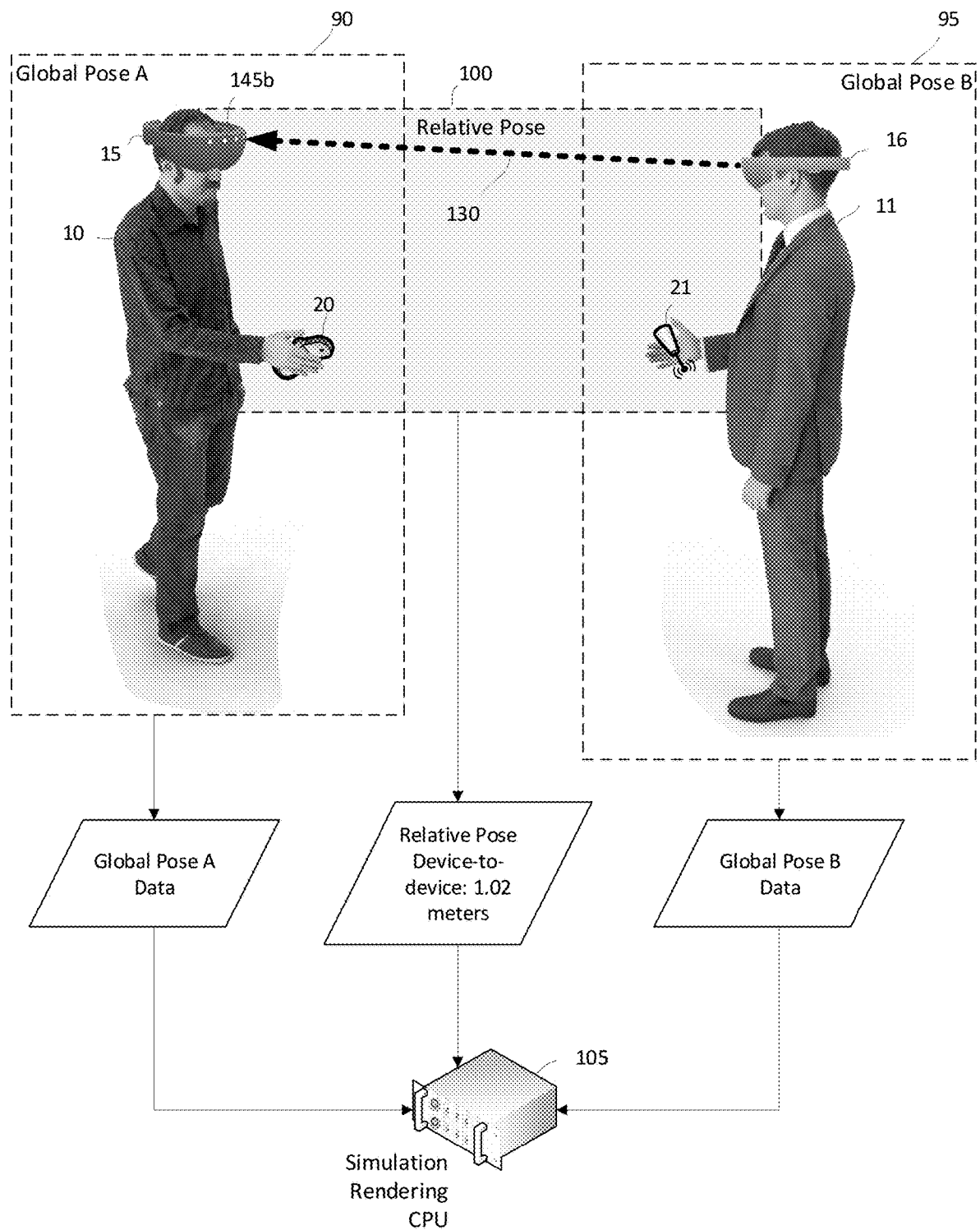
FIG. 11 is an elevated, combined rendered, and diagrammatic view of communication between two HMD devices according to an embodiment of the invention showing a first HMD device camera gathering distance measurement data from a second HMD having a plurality of IR LED lights.
Figure 12:
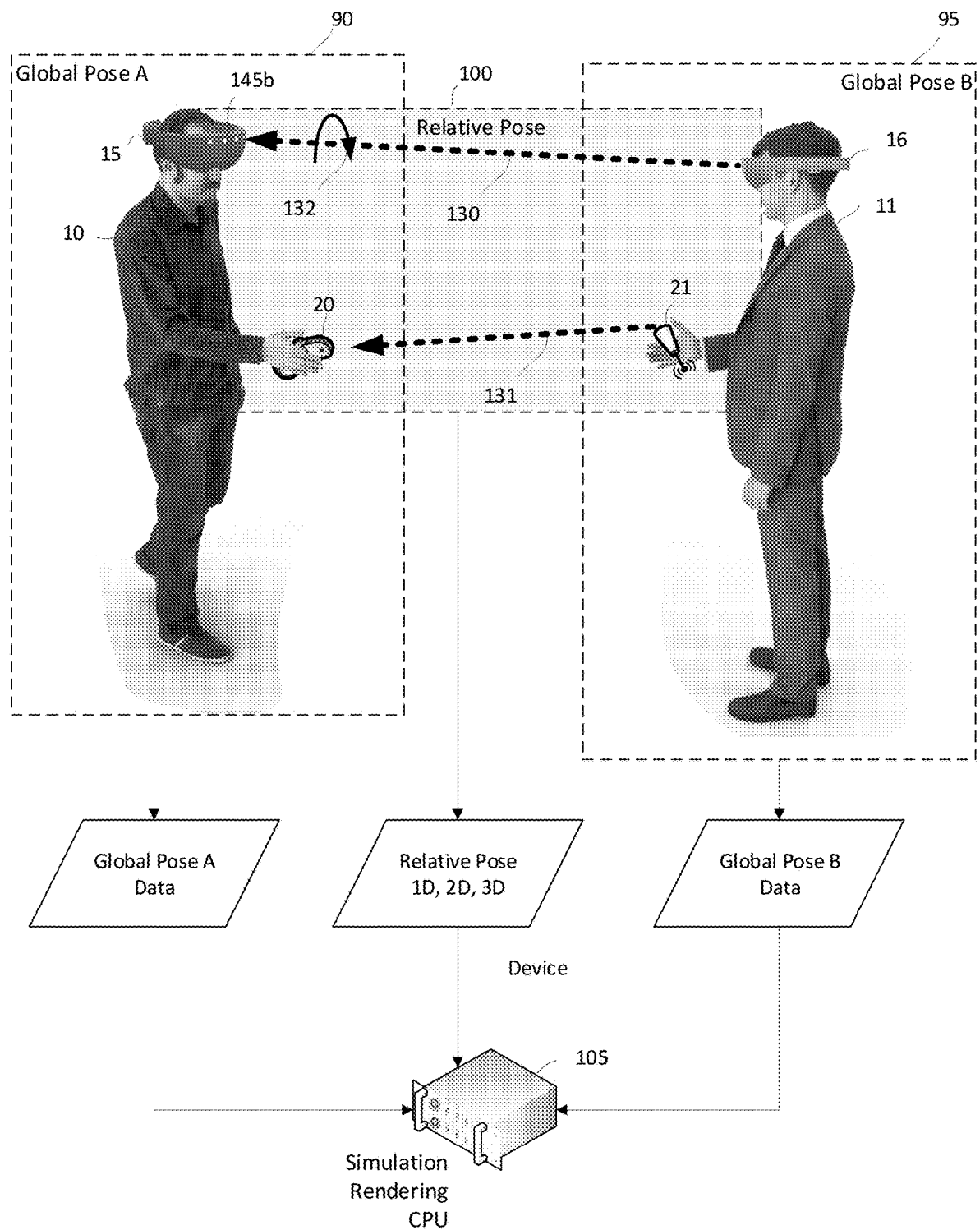
FIG. 12 is an elevated, combined rendered, and diagrammatic view of communication between two HMD devices according to an embodiment of the invention showing a first HMD device camera gathering pitch measurement data from a second HMD having a plurality of IR LED lights.

FIG. 10 shows an embodiment of headset 140 having infrared light-emitting diodes (LEDs) 145a-145c. The imaged length between LEDs 145a, 145b and/or 145c conveys distance to the headset 140 as the placements of the LEDs are known. LEDs may have unique signaling so that the pitch, roll, and yaw of headset 140 is more easily measurable. This is demonstrated in FIG. 11, where an integral camera in headset 16 images LEDs 145a and 145c deriving distance, orientation into relative pose 100 and optically-derived distance of 1.33-meters. This may supplement the ultrasonically derived 1.02-meter distance between hand-held controllers in FIG. 9 to enhance relative pose 100 on both the head and right hands of the respective users. This is further shown in FIG. 12, showing the simultaneous acquisition of ultrasonic distance between hand-held controllers 20 and 21 and headsets 15 and 16. The relative pose may be distance only (1D) or (gathering more quantitative measurement) may expand into 2D and 3D relative pose data.

Ground Vehicle Embodiment

In an embodiment of the invention, two vehicles (e.g., cars) are co-located on a roadway. Cameras on each vehicle include rear and dash-mounted. A first car may transmit signals to a second car such as turn signals, flashing lights, or the like. Proximity sensors (e.g., rear backup sensors) sense the relative pose measurement (for example, distance). In other words, the first car queries the second car to take measurements and report back and/or the first car could itself measure (sense/received) while the first car is transmitting as part of the proximity measures.

Turning now to a specific vehicle, the 2021-year vehicle sold under the brand TELSA MODEL X has 3 forward cameras, 2 side cameras, and 12 surrounding sonar sensors. An "Easter egg" (e.g., a non-essential entertaining feature) of the MODEL X is a light-show and broadcast of the instrumental "Wizards in Winter" by the Trans-Siberian Orchestra. The light show of this Easter egg is programmed to flash various lights on the MODEL X in synchronization with the musical score. The specific addressing of lights, under the present invention, is used to collaboratively signal other cars with cameras for gathering relative pose measurements. For example, in poor weather, one vehicle could request the MODEL X rapidly flash two turn separate signals in a specific sequence. Because the precise distance and orientation of the two lights on the MODEL X are known, relatively simple trigonometry resolves the orientation and distance of the MODEL X relative to the observing vehicle. Accordingly, the relative pose between the two vehicles is estimated with greater precision from the communication. This is further achieved imperceptibly to the naked eye using short pulse flashes, which are visible to a time-synchronized on-vehicle camera. In this way the flashing lights do not confuse nearby drivers. U.S. Pat. No. 5,870,136 (the '136 patent) describes using imperceptible structured light for environments in which humans work to avoid disorientation. The disclosure of the '136 patent is incorporated herein by reference.

In an embodiment of the invention, light pulses are "one off" (single, individual) only as needed. Several constraints include: (1) the pulse needs to be detectable by the other vehicle, and (2) ideally, it would not be perceptible by humans. Variable factors contribute to the preferred pulse parameters. These include ambient light, the characteristics of the light element itself (e.g., how long it takes to achieve a certain brightness), how long the other vehicles camera is able to "expose" (sample) the scene (this can be impacted by the relative vehicle speed), the current estimate of the relative distance between the vehicles, the current estimate of the relative angle to the other vehicle, and other factors.

Often such systems use "differential signaling"—that is, they look at the difference between a measurement with the signal and a measurement without the signal. Sometimes people refer to things like the "dark-light-dark" pattern of measures, i.e., measure with no signal, measure with the signal, and measure again without the signal. Then, one can differentiate the images to see the change that results only from the signal's presence. This makes "extracting" (detecting) the signal much more robust than simply scanning an entire image and trying to find it.

Figure 13:
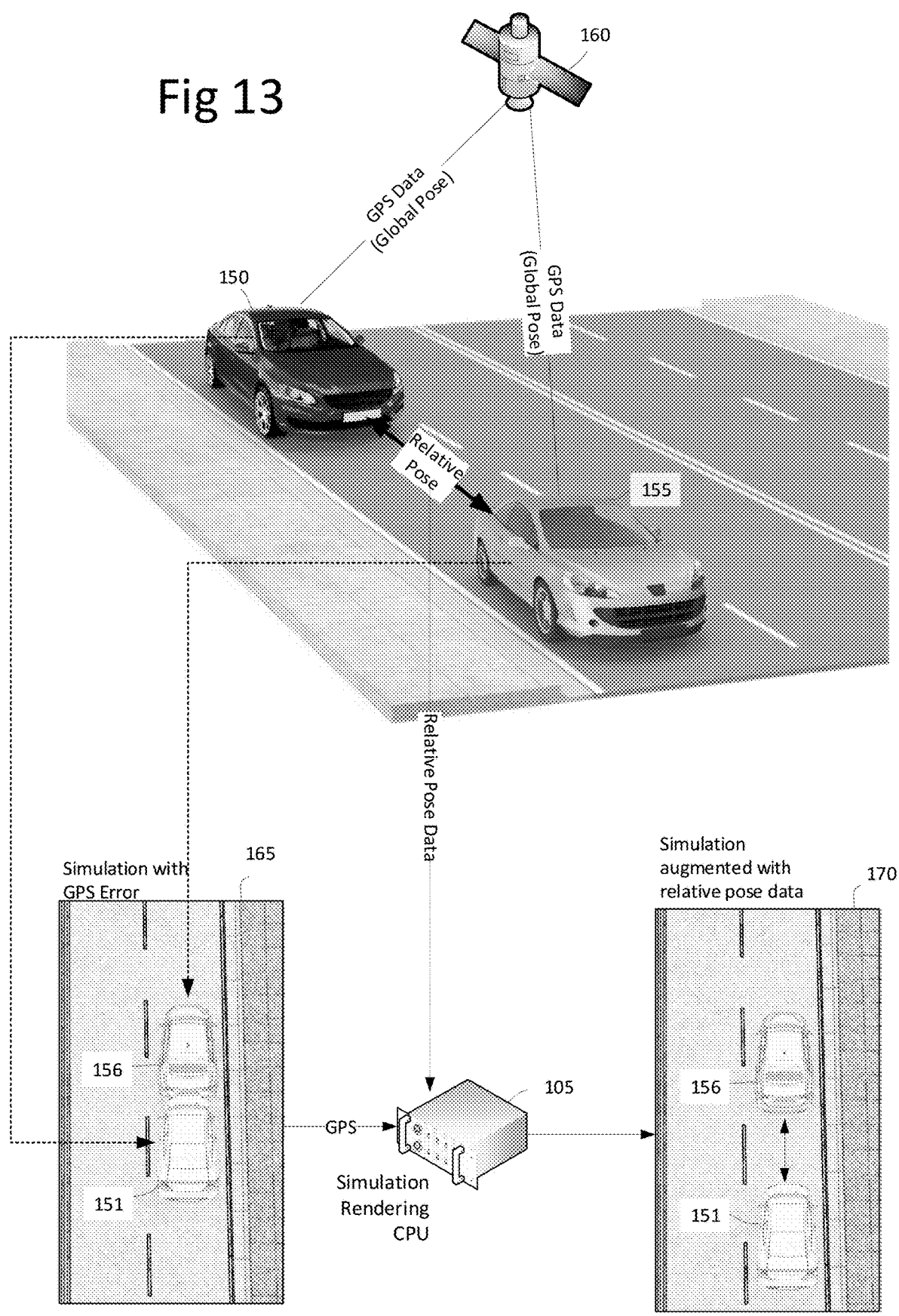
FIG. 13 is an elevated, combined rendered, and diagrammatic view of communication between two vehicles to improve an in-car rendered display of the relative position between the two vehicles otherwise positioned by GPS satellite.

FIG. 13 shows an embodiment of the invention where two autonomous vehicles travel in a traffic lane. A computer renders an environment simulation based on their GPS satellite 160 data. First car 150 renders in-dash simulation 165, which includes a rendering of itself 151, and second car 155 traveling in front of it. Second car 155 is rendered as object 156 in simulation 165, transmitting its GPS data to the simulation 165. However, in this situation, an ultrasonic sensor between first car 150 and second car 155 augments the accuracy of the relative position of rendered object 156 to object 151.

Figure 14:
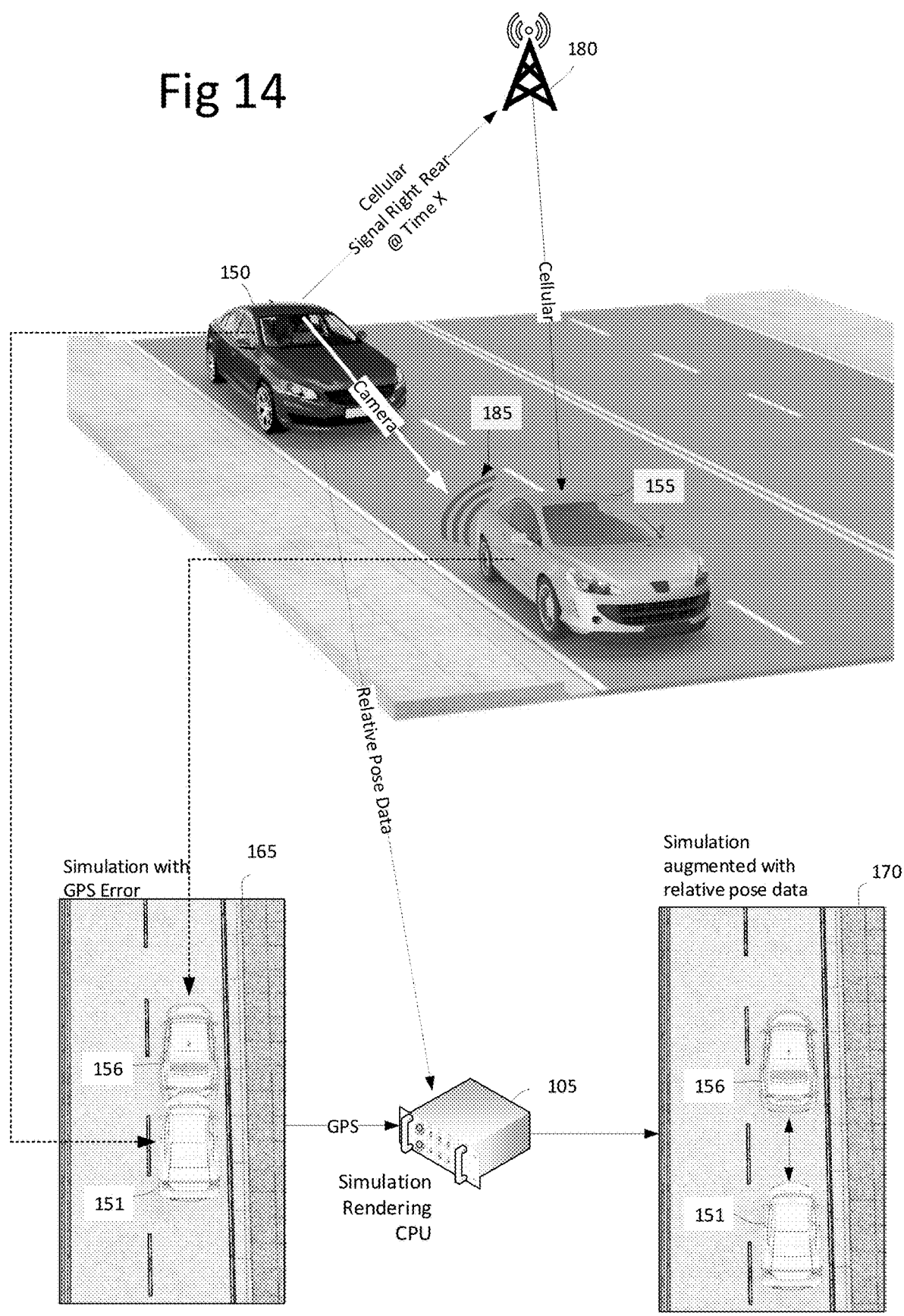
FIG. 14 is an elevated, combined rendered, and diagrammatic view of cellular communication between two vehicles to improve an in-car rendered display of the relative position between the two vehicles by coordinated light signals.

In FIG. 14, vehicles communicate with each other through cellular data, and a camera on first car 150 detects human-imperceptible structured light signaling 185 on second car 155 to derive quantitative measurements of its location.

Additional embodiments include using the Institute of Electrical and Electronics Engineers (IEEE) standard 802.15.1 (known under the brand BLUETOOTH) for short-range communication (typically about ten (10) meters). Camera tracking between cars is improved by adding red-green-blue (RGB) light-emitting diodes (LEDs) on the cars. Ultrasound is further used to collaboratively track other cars in front or behind.

Unmanned Aerial Vehicle (UAV) Embodiment

An unmanned aerial vehicle (UAV) is commonly known as a drone. It is an aircraft without a human pilot onboard and a type of unmanned vehicle. A swarm or fleet of UAVs is a collection of drones operating together to achieve a specific goal. Drone swarms may operate in close proximity, and therefore exchanging relative pose data is beneficial to operation. IMUs and GPS data have limited utility for these applications, so an embodiment of the invention utilizes the common pan/tile RGB cameras on the drones to track other objects in RGB light. Stereo camera pairs are used to collaboratively track other drones, particularly by adding time-synchronized RGB LEDs on the drones. Drone clusters are used to "render images in the sky" as they are equipped to display light, and so the "natural imagery" rendered in the sky is used for cooperative tracking.

Figure 15:
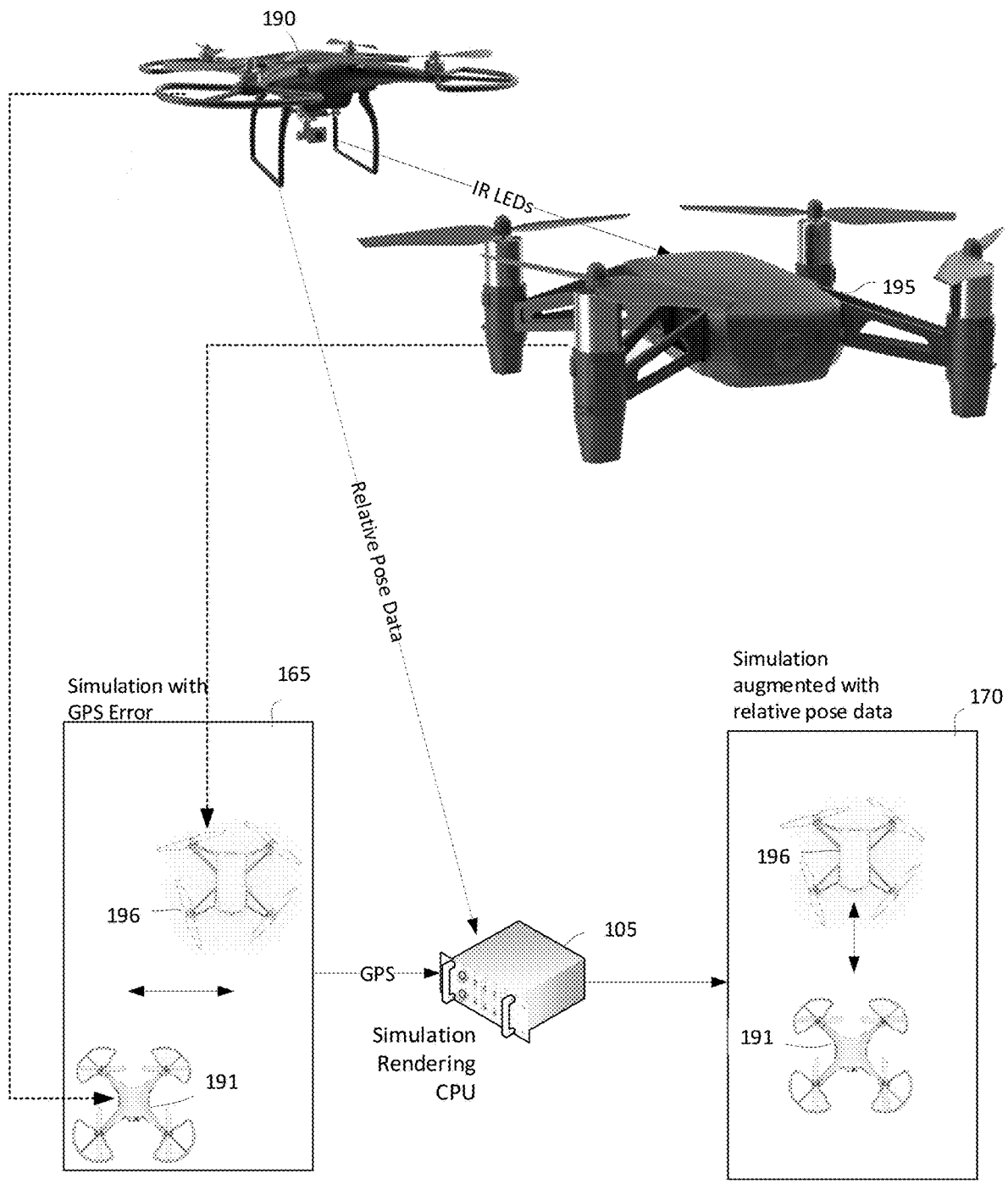
FIG. 15 is an elevated, combined rendered, and diagrammatic view of communication between two drones to improve a rendered display of the relative position between the two drones otherwise positioned by GPS satellite by a first drone's camera reading of a second drone's IR LEDs.

FIG. 15 shows first drone 190 and second drone 195 using infrared LED signaling to augment relative pose data for both simulations rendering a correction of relative position.

Virtual/Augmented Reality Embodiments

Existing virtual reality and augmented reality equipment benefit from the present invention. For example, technology under the WINDOWS MIXED REALITY brand having controllers tracked relative to the HMD using RGB LEDs and cameras. The technology has two RGB cameras that are front-facing cameras used for simultaneous localization and mapping (SLAM). SLAM is a technology that interprets the physical world through feature points. SLAM enables AR applications to recognize three-dimensional objects and scenes. The cameras are used for SLAM inside-out tracking and also used to track other objects in RGB light. Furthermore, the cameras can gather data for relative controller tracking. In a co-located space, the RGB LEDs of an independent controller (e.g., operated by another person) are tracked by the camera, and those measurements are cooperatively shared to better estimate the relative pose between controllers of a first person and a second person.

Another system goes by the brand HTCC VIVE (LIGHTHOUSE). This HMD has infrared (IR) photoreceptors. Inside the headset's outer-shell divots are dozens of infrared sensors at known positions that detect base stations' IR pulses to determine the headset's current location in a space. The base stations emit timed IR pulses at 60 pulses/second. HMDs, controllers, etc., "cooperate" by attempting to control lighthouse units in a way that is best for their joint existence, i.e., as opposed to a brute-force scanning of the scene (the normal mode). Accordingly, they affect more "intelligent" scanning that provides the information needed for the current circumstances.

Yet another system is branded OCULUS (CONSTELLATION, INSIGHT). The HMD comprises IR LEDs in a rigid body. RGB cameras provide SLAM inside-out tracking. This is useful for tracking other objects in RGB light. Base stations are IR cameras that are stationary in a room. Single-camera or multi-camera rigid body tracking exists, but they could also be used to track other objects in IR light.

Another system is branded PLAYSTATION VR, which comprises a fixed offset stereo RGB camera (environment-mounted) and a 4-channel microphone array. The RGB camera tracks objects in RGB light, and the microphone array tracks audio signals in a humanly perceptible range. Like other WIFI (IEEE 802.11) capable HMDs, the WIFI signals themselves are trackable for measure estimates between devices. This is also available via Bluetooth (IEEE 802.15) signals for measurements. Hand controllers illuminate RGB-colored sphere of known size; detected by an environment-mounted camera to determine both direction and distance (providing full 3D positional tracking). An embodiment of the invention amounts the environment cameras to the HMD for cooperative measurements.

Microsoft Corporation sells AR hardware under the HOLOLENS brand. There are two versions, the HOLOLENS 1 released in 2016 and the HOLOLENS 2 released in 2019 (collectively HOLOLENS). The HOLOLENS has an RGB camera and four additional grayscale cameras. Each camera is used to track other objects in RGB light. The device further has a time-of-flight (TOF) camera. A TOF camera is a range imaging system. It uses time-of-flight techniques to determine the distance between the camera and an object for each point of the image. It achieves this by measuring the round-trip duration of an artificial light signal provided by a LED or laser emission. The HOLOLENS further includes a microphone array for tracking audio signals. WIFI and Bluetooth signals are also emitted and could be measured under an embodiment of the invention for relative pose data. The emitted IR light from the TOF sensor is picked up by other HOLOLENS to sense the direction of that HOLOLENS (if inside FOV and without true position data). Radio frequencies (WiFi and Bluetooth) are used for COMOCAP tracking. Apart from that, the HOLOLENS can sense numerous parameters, but it does not emit much into the environment that could be sensed. An embodiment of the invention adds IR/RGB LEDs to the HOLOLENS like used in Windows Mixed Reality headset to make it useful for COMOCAP. SFM (SLAM) component could "see" another HOLOLENS, giving it some cooperative data—it would only look for the other HOLOLENS when it knows it needs to.

Finally, the SAMSUNG GEAR VR/MOBILE AR has microphones and speakers for tracking audio signs. Its cameras track other objects, and WIFI and Bluetooth signals are trackable for COMOCAP. Like other systems, a relatively small addition of RGB/IR LEDs would enhance COMOCAP measures between devices.

Figure 16:
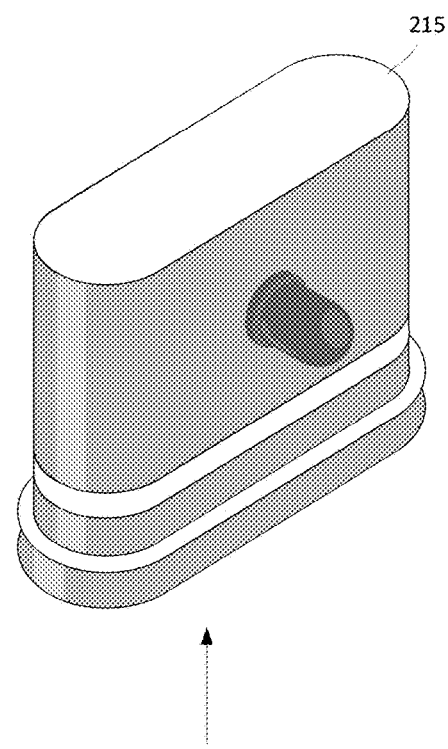
FIG. 16 is a partially exploded, isometric view of an infrared transmitter.
Figure 16:
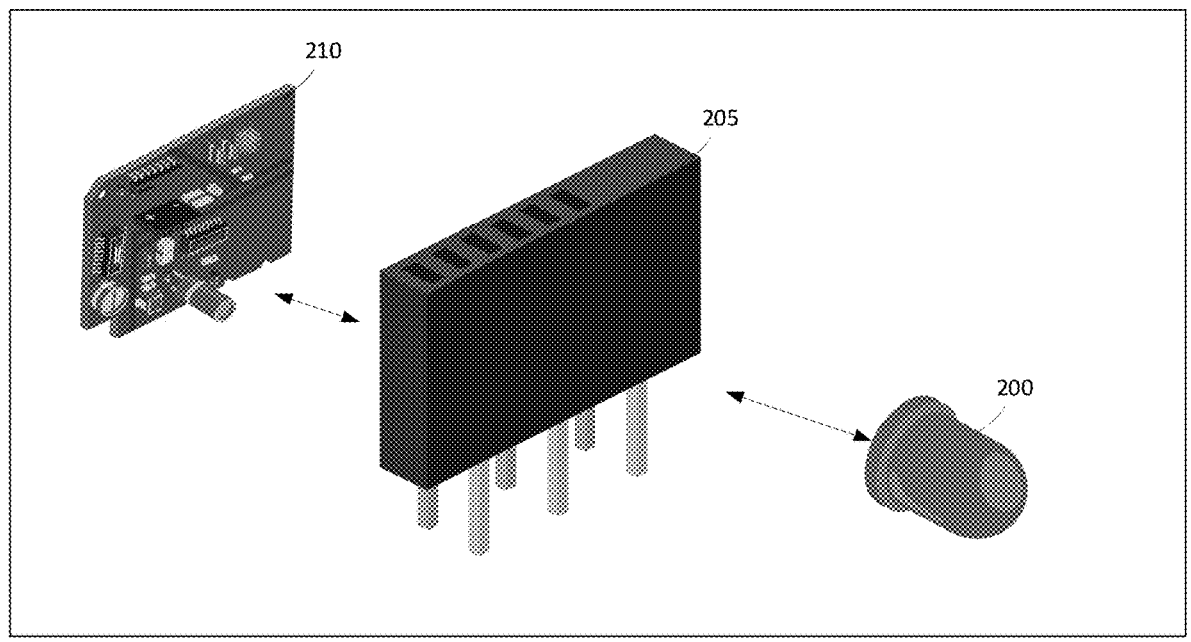
Figure 17:
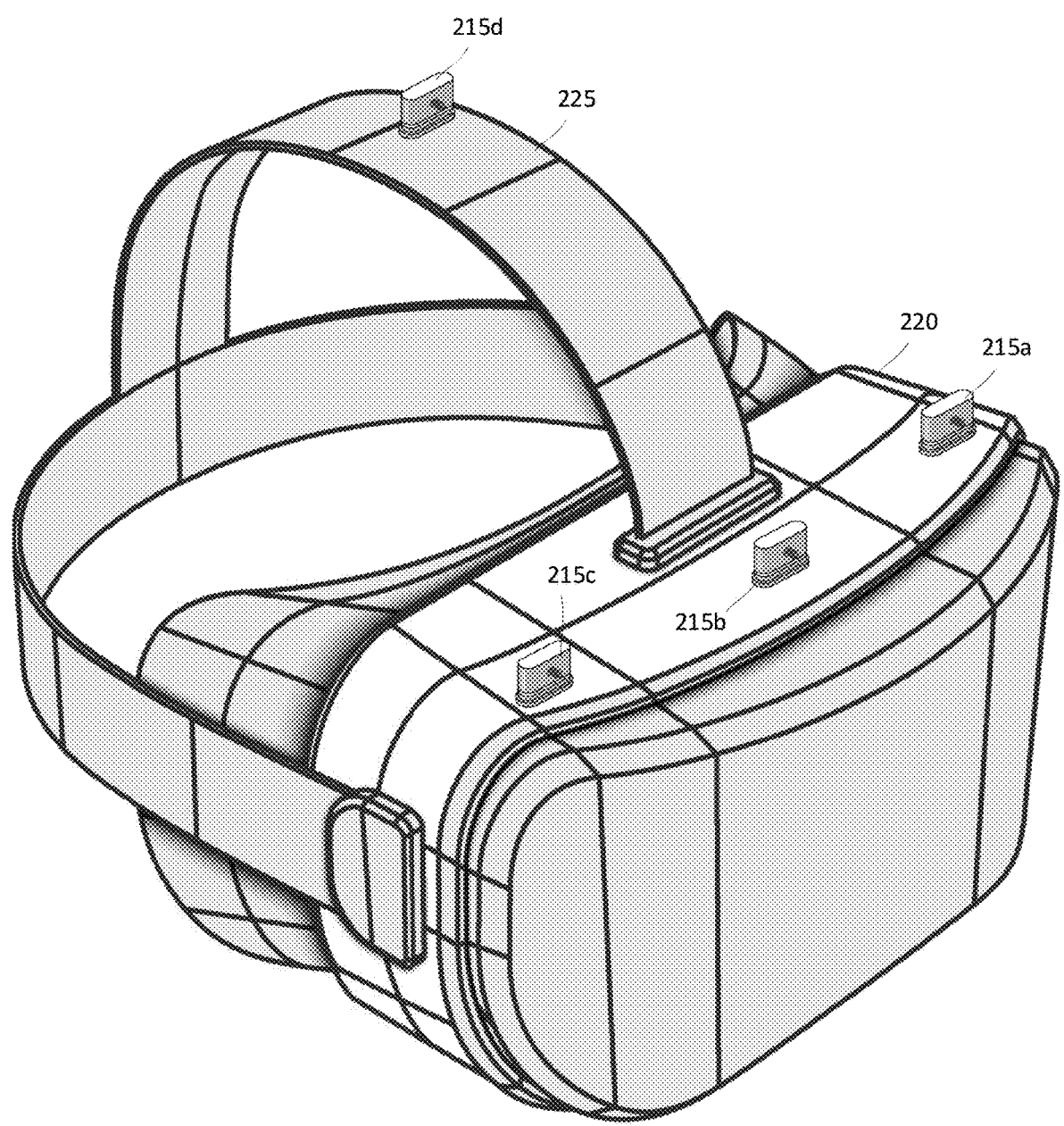
FIG. 17 is an elevated, isometric view of an HMD with a plurality of infrared transmitters affixed thereto.

FIG. 16 shows an embodiment of the invention using an inexpensive IR LED transmitter 215, which comprises an LED light 200, a mount 205, and circuit board 210. The IR LED transmitter 215 may be affixed to existing devices to enhance relative pose measurements. For example, FIG. 17 shows a plurality of LED transmitters 215a-215d affixed to VR headset 220 and VR headset head strap 225, giving another device easy reference points to the relative pose of headset 220.

Glossary of Claim Terms

Augmented Reality (AR) means a form of virtual reality that augments a user's view of the real world with virtual content. Various mechanisms exist for carrying out the augmentation. One popular mechanism is to layer virtual information over a live camera feed of the real world fed into a headset known as a video see-through head-mounted display (HMD), possibly through a portable computing device. Alternatives include the use of optical see-through HMDs where the virtual content is layered over a direct view of the real as seen through an optical combiner system (combining real and virtual views); hand-held augmented reality, for example, via a mobile "smart" phone with a camera and a display; and spatial augmented reality (SAR) where the virtual image is displayed directly on (or as part of) real-world objects, as opposed to in the user's visual field. One popular means for SAR is to use a digital projector to project imagery directly on an object, hence changing the appearance of the object. One specific method is that of Shader Lamps rendering (Raskar, Welch, and Fuchs), which is sometimes referred to as "projection mapping." These are just some examples of ways to achieve AR.

Common Shared Virtual Object (CSVO) means a rendered virtual object visible to a plurality of users in a co-located space.

Communicatively Coupled means a data connection between one or more computing, sensor, storage, and/or networking devices wherein information is exchanged.

Computer Simulation Engine means the combination of computer processor(s) and software instructions to coordinate a simulation integrating both physical and computer-generated reactions to the actions of a trainee as detected by combinations of signal sources and sensors and/or extrinsic controls (e.g., instructor control of simulation).

Dimensional means having enough depth and substance to be believable.

Global pose means a device pose (position and/or orientation) that is specified in, or referenced to, a common coordinate frame shared by two or more devices (typically all of the devices). For example, the U.S. Global Positioning System (GPS) can be used to measure the 3D position of each GPS receiver relative to a common "global" coordinate frame associated with the earth.

Haptic means the generation of a simulated sense of touch (or a tactile sensation) by applying various surrogate stimuli such as motions, vibrations, changes in temperature, changes in texture, changes in moisture, or forces to a user.

Headset or Head-Mounted Display (HMD) is a head-worn device that provides virtual reality to the wearer. They often include a stereoscopic pair of display screens (frequently providing separate images for each eye), stereo sound capability, and head motion position and/or orientation tracking sensors, e.g., employing gyroscopes, accelerometers, or structured light systems.

Indicia (or Indicium) means signs, indications, or distinguishing marks. For the purposes of claim construction, an indicium (singular) does not preclude additional indicium (e.g., indicia or multiple orientation marks).

Optical means operating in or employing the visible part of the electromagnetic spectrum.

Relative pose means a pose (position and/or orientation) that is specified in, or referenced to, the coordinate frame of a specific device. For example, a camera rig comprising a stereo pair of cameras can be used to measure the "local" distance and direction to a visible feature (e.g., on a second device) relative to the "local" coordinate frame associated with the camera rig.

Sensor means a device or peripheral thereof that detects or measures a physical property and records, indicates, or otherwise responds to it.

Tactile means perceptible to touch.

Virtual Reality means a computer-generated scenario that simulates a realistic experience. Augmented Reality (AR) systems are considered a form of VR that layers virtual content into the user's visual field using video or optical HMDs, smartphones, or directly in the scene as described above, optionally through a portable computing device.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of estimating a relative position in a computer-simulated environment of two independently positioned and oriented but communicatively coupled HMDs in a co-located physical space, the method comprising the steps of:
    setting a first pose for a first HMD worn by a first user,
    setting a second pose for a second HMD worn by a second user,
    establishing a communication pathway between the first HMD and the second HMD, the first HMD having a sensor receiving a measurement related for a relative pose of the second HMD to the first HMD;
    receiving by the sensor in real-time, by the first HMD the measurement related to the relative pose of the second HMD to the first HMD;
    transmitting the measurement related to the relative pose received from the first HMD to a computer processor;
    applying a computational algorithm to augment the first pose and the second pose with the measurement related to the relative pose of the second HMD to the first HMD in the co-located physical space;
    modifying the computer-simulated environment to render a more accurate relative pose of the first HMD and second HMD with respect to a common shared virtual object observable by the first user and second user; and
    displaying the computer-simulated environment on the first and second HMDs.

2. The method of claim 1, wherein the HMDs render the shared virtual object in augmented reality (AR).

3. The method of claim 2, wherein the HMDs render the shared virtual object in virtual reality (VR).

4. The method of claim 2, wherein the common shared virtual object is rendered between the first user and the second user.

5. The method of claim 4, wherein the common shared virtual object is a rendered hand of the first user.

6. The method of claim 1, further comprising a step of deriving the first HMD pose from an external video tracking device.

7. The method of claim 1, further comprising a step of deriving the first HMD pose from a spatial anchor.

8. The method of claim 1, further comprising a step of decreasing a measurement frequency interval in the communication pathway between the first HMD and the second HMD as the first HMD and second HMD separate and increasing the measure frequency interval in the communication pathway between the first HMD and the second HMD as the first HMD and second HMD approach each other.

9. A method of estimating a relative position in a computer-simulated environment of two independently positioned and oriented but communicatively coupled devices in a co-located physical space, the method comprising steps of:
- setting a first pose for an HMD worn by a first user,
- setting a second pose for a hand controller held by a second user,
- establishing a communication pathway between the HMD and the hand controller, the HMD having a sensor receiving a measurement for a relative pose of the hand controller to the HMD;
- receiving by the sensor in real-time, by the HMD the measurement related to the relative pose of the hand controller to the HMD;
- transmitting the measurement related to the relative pose received from the HMD to a computer processor;
- applying a computational algorithm to augment the first pose and the second pose with the measurement related to the relative pose of the hand controller to the HMD in the co-located physical space;
- modifying the computer-simulated environment to render a more accurate relative pose of the HMD and hand controller with respect to a common shared virtual object observable by the first user and second user; and
- displaying the computer-simulated environment on the HMD.

10. The method of claim 9, further comprising a step of deriving the first HMD pose from a spatial anchor.

* * * * *